March 28, 1961 W. H. SHAPERO ET AL 2,977,264
CONTAINER WITH FILM GLASS AND EPOXY RESIN COMPONENTS
IN THERMOPLASTIC WALL STRUCTURES
Filed Feb. 18, 1957

INVENTORS
WALLACE H. SHAPERO,
BY ROY ELBERT DAVIS,

Lynn H. Latta
ATTORNEY

2,977,264
CONTAINER WITH FILM GLASS AND EPOXY RESIN COMPONENTS IN THERMOPLASTIC WALL STRUCTURES

Wallace H. Shapero, Balboa, and Roy Elbert Davis, Burbank, Calif., assignors, by mesne assignments, to Continental Can Company, Inc., New York, N.Y., a corporation of New York Filed Feb. 18, 1957, Ser. No. 640,630

6 Claims. (Cl. 154—43)

This application is in part a continuation of our joint patent application Serial Number 524,993, filed July 28, 1955, for Flexible Container, now issued as Patent No. 2,815,896, and of parent applications S.N. 390,123, filed Nov. 4, 1953, and 303,597, filed Aug. 9, 1952, now both abandoned.

This invention relates to containers and the like, of thermoplastic material and has as its general object to provide a container or the like embodying a wall structure of improved resistance to the passage of moisture therethrough. The invention is particularly useful in containers for holding aqueous solutions, dispersions, suspensions, etc. (e.g. medicines, cosmetics, lotions etc.) which may be required to stand upon a drugstore or grocery shelf for months before finally purchased.

More particularly, the invention contemplates an improved container of thermo-plastic synthetic resin material embodying a wall structure (or one or more laminations in a composite wall structure) having improved impermeability to water vapor, i.e., having a reduced water vapor transmission rate, so as to be capable of retaining aqueous contents without any substantial loss of water by evaporation Another object is to provide an improved container of thermoplastic synthetic resin material, having improved characteristics of stiffness, resistance to various chemicals, and resistance to solvent extraction (i.e. resistance to the migration of solvent from one layer to another in laminated wall structure or to the escape of solvent from an inner lamination of the container into the contents thereof, or from the outer wall structure of a container into the atmosphere-drying).

Figure 1:
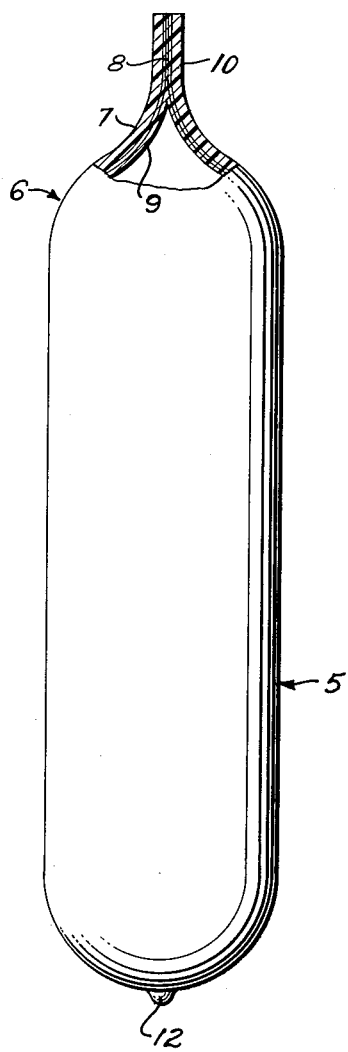
Figure 2:
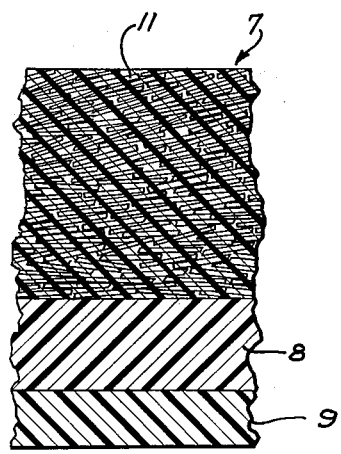

Other objects will become apparent in the ensuing specification and appended drawing in which:

Fig. 1 illustrates a container, partially in section, embodying the invention; and Fig. 2 is a cross sectional view of the wall structure of the container, shown on a magnified scale.

Referring now to the drawings in detail, we have shown therein, as an example of one form in which the invention may be embodied, a container 5 having a wall structure at least a portion of which comprises a sheet-like body of thermo-plastic resin plastisol, indicated at 6. While the invention is applicable to an article having uniform structure throughout its thickness (i.e., a single layer of material), it is especially useful in a laminated wall structure such as that of the container shown, wherein an outer body layer 7 provides the majority of the mechanical structure of the container and wherein additional laminations such as the intermediate layer 8 and the lining layer 9, are utilized for imparting to the container, improved properties as more fully pointed out in our above mentioned patent application.

For example, the intermediate layer 8 may contain a resin (e.g. a thermosetting resin mixed with a thermoplastic resin) adapting it to function as a barrier layer, to resist the migration of solvents between the outer layer 7 and the lining layer 9; and the lining layer 9 may be of a thermoplastic resin (e.g. polyvinyl chloride) which is heat sealable so as to provide for sealing the open end of the container at 10. The thermosetting resin of the barrier layer may be any one of a number of resins including aldehydes such as the urea and phenol formaldehydes; di-ethyleneglycol di-methacrylate; a modified nylon material having an additive such as formaldehyde to give it a thermosetting characteristic; and epoxy resins such as the complex polymers of epoxy-bisphenol compounds commonly known as "Epon" resins. The thermoplastic resin of the middle layer is preferably the basic resin of the other layers (e.g. polyvinyl chloride). The middle layer may be a homogeneous mixture of thermoplastic and thermosetting resins, or may consist in a number of separate sub-layers, one of thermoplastic and the other of thermosetting resin, integrally united or through an intervening adhesive layer, as disclosed in our Patent No. 2,815,896 above referred to.

The outer body layer 7 (comprising 50% or more of the total wall thickness) is comprised primarily of a mixture of a thermoplastic resin and a plasticizer which are adapted, when intermixed and subjected to heat, to enter into a plasticized state having some of the characteristics of a solution and commonly known as a plastisol, and particularly characterized by a high degree of flexibility and toughness and high tensile strength.

For example, the outer layer may utilize, as a basic resin, a polyvinyl chloride monomer resin or a copolymer of vinyl chloride and vinyl acetate (or vinylidene chloride or maleate or acrylonitrile) resins to the extent of about 60% of the resin content; and may further include about 40% of a plasticizer resin such as di-2 ethyl hexyl phthalate or di-iso-octyl hexyl phthalate. The plastisol resin is ordinarily thinned by a solvent as hereinafter specified.

In addition to the plastisol body, the body layer 7 includes a very substantial percentage of solids in the form of minute flakes of glass which we will refer to as film glass or flake glass. Such flakes are of extremely small dimension, such as to be properly described as constituting a powder. In size the flakes may range downwardly from five microns in thickness. The diameter is several times the thickness, and are in the range of diameters such as to pass through a screen of between 160 and 200 mesh. Such film glass flakes may be produced by pulverizing larger flakes of approximately 5 microns thickness, in a hammer mill until the powder consistency is attained.

In addition to the plastisol and the film glass components, the coating 7 includes preferably an epoxy resin which is added to the plastisol to provide improved stiffness, chemical resistance and resistance to solvent extraction. Such epoxy resin may be Epon No. 828 (Shell Chemical Co.), Bakelite No. 2795, with an additive (in either case) of di-cyanadiamide as a catalyst, or Shell No. 1001 Epon, General Mills polyamide No. 115 by way of example. The percentage thereof, in the plastisol resin (before the addition of the film glass and the solvent), is between the ratio of 5% epoxy to 95% plastisol and the ratio 50% to 50% plastisol.

For the main body layer, the plastisol resin is thinned by the addition of the plasticizer (e.g. dioctyl phthalate) in sufficient amount to provide the necessary fluidity for satisfactory layer-forming and draining qualities in the dipping operation. Where the maximum quantity of film glass is used, a somewhat greater percentage of plasticizer is likewise used, to the extent of approximately 10 parts plasticizer per 100 parts resin by weight; and where the minimum amount of film glass is employed, no or very little additional plasticizer is added.

Where used as a liner layer, the plastisol resin is thinned by the addition of a solvent (e.g. xylene toluene) in sufficient amount to provide the necessary fluidity for satisfactory layer-forming and draining qualities in the dipping operation. Where the maximum quantity of film glass is used, a somewhat greater percentage of solvent is likewise used, to the extent of approximately 30% solvent for 70% plastisol resin, by volume; and where the minimum amount of film glass is employed, the percentage of solvent may be somewhat reduced, to the ratio of approximately 2% solvent to 98% plastisol resin, by volume. However, we find that it is not desirable to greatly vary the percentage of solvent for a given volume of plastisol resin, since the viscosity of the plastisol resin must be maintained at a fairly high level in all cases.

The film glass flakes 11 are arranged in overlapping arrangement in the layer 7, resembling generally a deep layer of roofing shingles on a minute scale, and to a large extent are in face to face overlapping engagement as roughly indicated in Fig. 2. While many of the flakes obviously will extend transversely to the faces of the coating 7, the majority of the flakes are lined up in rough parallelism to the faces of the coating, as the result of attenuation of the coating in the process of fabricating the container. At this time it should be explained that the invention contemplates, in general, the dip-forming of the container on a mandrel which is first dipped into a liquid bath of the material which forms the lining 9, is subsequently dipped into one or more additional baths to form the one or more intermediate coatings 8, and is finally dipped in the plastisol material to form the relatively thick outer coating 7. While the plastisol material is in a thicker, more viscous state in order to deposit a much thicker wall than the other coatings, it is nevertheless sufficiently fluid to run downwardly on the vertically suspended mandrel on which the tube is formed, with excess plastisol material dripping back into the dip tank and into collecting pans as the mandrel is conveyed away, and finally leaving a tear 12 at the lower end of the container as it is cured by the application of heat to the dipped coatings. In the process of running, the outer layers of the coating 7 will shift longitudinally with reference to the successive inner layers thereof, and in this shifting of successive layers, the film glass flakes will be tilted in a manner to "lay down" against one another until their orientation is predominately in parallelism with the wall of the mandrel.

As the result of the overlapping, face to face contacting arrangement of the film glass flakes 11, they provide a shingled covering which is substantially impervious to the passage of any liquid, resembling the solid glass wall of a conventional glass bottle in that respect. The invention provides an especially improved reduction in water vapor transmission rate, resisting the evaporation of aqueous solvents in medicines etc., contained in the plastic containers of our invention when allowed to stand upon a drug store shelf for periods extending into months. The invention also provides improved resistance to the migration of plasticizers such as, for example, the plasticizer that is used in fluidizing the plastisol solution in the dipping bath, it being important to prevent the migration of the plasticizer to the inner layer 9 which is desirably a relatively hard, only slightly plasticized layer of the basic resin used in the outer coating 7 (or another suitable thermoplastic resin). We have found, unexpectedly, that the improvement in resistance to transmission of such plasticizers is not as great as the improvement in resistance to the transmission of water vapor, but this is not a disadvantage. On the contrary, the fact that maximum improvement in reduction of water vapor transmission rate is attained, is a most important advantage, since fairly satisfactory resistance to solvent migration and extraction can be attained by the use of suitable resins in the intermediate layer or layers 8, as more fully disclosed in our earlier patent application above identified. Nevertheless, the improved resistance to solvent extraction is an advantage when packaging products containing solvents.

The invention further provides an improved resistance to deterioration from various chemicals that may be contained in the container, and this likewise is an advantage.

Another and very important advantage attained by the invention is greatly improved stiffness in the outer body layer 7. This makes it possible to substantially reduce the thickness of layer 7 as much as 50% below the thickness required for satisfactory form retention in a container wherein the outer body is composed entirely of the plastisol resin material. For example, in the container of our above identified pending application, the outer body layer preferably constitutes 75% or more of the total wall thickness.

Preferably, the film glass flakes are pre-coated with a coupling agent for improved adhesion. Such a coupling agent may comprise a vinyl thermoplastic resin such as polyvinyl chloride in an extremely thin coating covering each glass flake.

The percentage of glass flakes in the plastisol resin is important. In general, it is preferable to utilize somewhat less than the maximum percentage of film glass that can successively be utilized. Thus far, we have found that forty percent film glass, by weight (to sixty percent plastisol resin by weight) is approximately the maximum percentage of film glass that can be utilized. Above that percentage, the film glass loads the plastisol to an extent such that the solution becomes too pasty for successful dipping operations, and the solution will not properly run to form the smooth, uniform thickness coating that is aimed at and required in a satisfactory container. On the other hand, as the percentage of film glass is reduced, there is a corresponding reduction in resistance to water vapor transmission and solvent extraction etc. Good results in this respect are attained in the range from 20% to 40% of film glass in the dipping mixture, the improvement in the characteristics heretofore referred to being good at the 20% point. In the range between 20% and 10% of film glass in the dipping mixture, the improved characteristics are less noticeable, and below 10%, no substantial improvement in these characteristics can be ascertained. Thus the invention embraces the use of film glass in the range between the ratio of 10% of film glass to 90% of plastisol, by weight, up to the ratio of 40% of film glass to 60% of plastisol by weight. The optimum percentage lies at an intermediate point between 20% and 40% of film glass (e.g. 30% glass) for the reason that the orientation of the film glass flakes is improved as the percentage of film glass is reduced. That is to say, where the maximum percentage of film glass is employed, there is maximum interference between the glass flakes in orientation movements in the draining operation, and as the percentage of film glass is reduced, the consequent increase in fluidity improves the orientation movements of the flakes in the draining step. The degree of impermeability that is attained depends upon both factors, namely, (1) orientation and (2) the total number of flakes per unit volume of plastisol material, and the optimum result is thus attained at an intermediate percentage between maximum percentage of glass and maximum solidity.

The body of plastisol resin in layer 7 completely surrounds the glass flakes 11 in a cellular structure in which the flakes are supported, bound to one another, and maintained in their overlapping, contacting relation with freedom to shift slightly with reference to one another so as to accommodate normal flexing movements in the container wall, such as may be found in any container that is fairly stiff and form-retaining, yet not rigidly inflexible. Thus the resistance to shattering when subjected to sharp impact with rigid objects, is preserved in favorably comparable relation to other flexible containers.

We claim:

1. In a container, a laminated wall structure embodying a relatively thick, tough, flexible outer layer of thermoplastic plastisol resin and a plurality of minute flakes of film glass of powder size having generally a diameter several times thickness, embedded in said outer layer in overlapping, substantially face to face contact with one another in a continuous vapor impermeable shingled stratum within said outer layer and oriented with their individual planes generally parallel to the wall surfaces of said outer layer; an intermediate relatively thin barrier layer of thermoplastic resin intermixed with a thermosetting resin, resisting the migration of solvents therethrough; and a relatively thin lining of heat sealable thermoplastic resin as the lining of the container, said glass flakes being confined to said outer layer.

2. A container as defined in claim 1, wherein said film glass flakes are of powder size, of a thickness not more than 5 microns and a diameter in the range of from 10 to 50 microns.

3. In a container, a laminated wall structure embodying a relatively thick, tough, flexible outer layer of thermoplastic plastisol resin and a plurality of minute flakes of film glass of powder size having generally a diameter in the range of 10 to 50 microns and a thickness not more than 5 microns, said flakes being embedded in said outer layer in overlapping, substantially face to face contact with one another in a continuous vapor-impermeable shingled stratum within said outer layer, and oriented with their individual planes generally parallel to the wall surfaces of said outer layer; and a relatively thin layer of heat-sealable thermoplastic resin constituting the lining of said container, said glass flakes being confined to said outer layer.

4. A container as defined in claim 3, wherein said outer layer of said lining is of a resin including predominately a polyvinyl chloride.

5. A container as defined in claim 4, wherein said flakes are coated with a coupling agent of vinyl chloride and wherein the said thermoplastic material of said body is a plasticized polyvinyl chloride resin.

6. A container as defined in claim 5, including an epoxy resin as a minor component in addition to the plasticized polyvinyl chloride resin.

References Cited in the file of this patent
UNITED STATES PATENTS

| | | |
|---|---|---|
| 726,485 | Whitney | Apr. 28, 1903 |
| 2,148,510 | Simisom | Feb. 28, 1939 |
| 2,233,259 | Harth | Feb. 25, 1941 |
| 2,311,613 | Slayter | Feb. 16, 1943 |
| 2,427,513 | Spessard | Sept. 16, 1947 |
| 2,431,078 | Powell et al. | Nov. 18, 1947 |
| 2,457,785 | Slayter et al. | Dec. 28, 1948 |
| 2,602,785 | Wiles et al. | July 8, 1952 |
| 2,690,256 | Shaw | Sept. 28, 1954 |
| 2,704,105 | Robinson et al. | Mar. 15, 1955 |
| 2,707,177 | Skiff et al. | Apr. 26, 1955 |
| 2,794,756 | Leverenz | June 4, 1957 |
| 2,843,557 | Safford | July 15, 1958 |